3,426,832
METHOD OF MAKING METAL PATTERNS AND CORE BOXES FOR SHELL MOLDING
William J. Phillips, Las Cruces, N. Mex., and Donald B. Barron, Lakewood, Ohio, assignors to Crucible Steel Castings Co., Division of Consolidated Foundries and Manufacturing Company, Cleveland, Ohio
Filed Dec. 28, 1966, Ser. No. 605,385
U.S. Cl. 164—45
Int. Cl. B22c 7/04, 7/06, 9/12
7 Claims This invention relates to the manufacture of metal patterns and core boxes and more particularly to the method of the manufacture of patterns and core boxes for shell molding of metal castings.

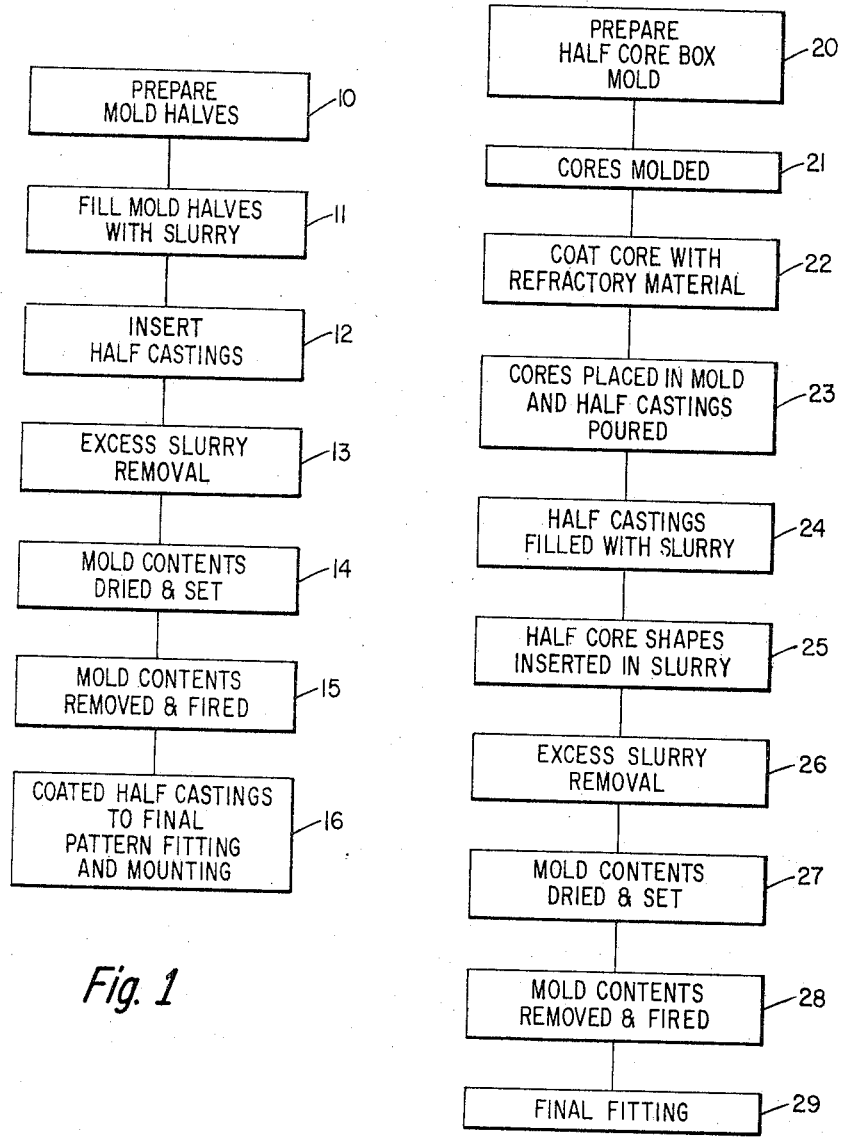

The process of shell molding is well known in the art. For example, one method of shell molding is disclosed in Bartlett et al., U.S. Patent No. 2,792,604. The advantages of shell molding are also well known in the art and they include such features as superior surface finish, dimensional uniformity, freedom from occluded sand and dirt, ease of cleaning, and better machineability. The principal disadvantage of shell molding, however, is the high cost of the essential pattern equipment. Such pattern equipment must be made of metal and must be accurate and smooth. The cost of such pattern equipment is usually from 8 to 10 times as high as the tooling cost for green sand molding. Numerous attempts have been made to solve this problem. In one attempt, cast refractory cements have been used. In another one of these attempts, epoxy resin with embedded metal chips and turnings have been used. The refractory cements are generally unsatisfactory because of the low heat conductivity and brittleness. The epoxy resin based patterns are also unsatisfactory because of the rapid deterioration of the organic material at temperatures of the order of 500° F.

Accordingly, it is an object of this invention to provide an improved method for making metal patterns.

It is another object of this invention to provide an improved method for making metal patterns and core boxes particularly adapted to shell molding.

Yet another object is to provide an economical method of reproducing existing wood pattern equipment in metal, adaptable to the shell molding process.

A further object of this invention is to provide an economical method of making metal patterns and core boxes for shell molding which method produces precision molds.

Briefly, existing green sand molding pattern equipment is used to produce a drag mold and a cope mold—a so-called "dummy" mold into which no cores are set. These mold halves can be of sand plus binder, plastic, refractory cement or epoxy resin. These mold halves are provided with a cover core or flat cope and means are provided for metal ingress. Each mold half is filled with liquid metal such as iron, steel, brass, bronze, aluminum or any other metal suitable for casting. The resultant castings from each mold half are cleaned and heat treated in a manner well known in the art. A second pair of mold halves of refractory cement or zircon sand and silicate are now prepared from the original pattern equipment. The composition of the molds is not critical provided the molds are true to pattern, smooth and capable of resisting temperautres to 150° C.

An alternate method of producing the so-called base casting is to ram into the mold cavity a mixture of iron powder and a suitable binder such as sodium-silicate. The resulting pattern is then dried at temperatures of the order of 80° C. to 150° C. after which the pattern is sintered at elevated temperatures under a non-oxidizing atmosphere, such as a vacuum of the order of 25 to 28 inches of mercury.

If the molds utilized in the first steps (sintered metal) have not been damaged, they are used in the subsequent procedure. If they have been destroyed, a second pair of molds is prepared.

Each half casting produced by either of the methods outlined above is now checked against the corresponding mold of the second pair. In the case of simple designs, where shrinkage is unhindered the half castings may fit into the mold cavity with clearance. In cases where shrinkage is restricted, it may be necessary to provide clearance by some means such as blasting, grinding, pickling, or repeated scaling. Obviously, the half castings cannot be used as patterns because shrinkage of some kind will have occurred and the surfaces will be too rough. Accordingly a method of pattern making including steps for adjusting these deficiencies must be employed.

Advantageously, in accordance with aspects of this invention, corrections for shrinkage and surface roughness are accomplished in the following manner. A slurry of copper powder and sodium silicate is poured into the mold and the half castings are shoved into this slurry until the mold is completely filled. The excess slurry is removed and the mold and contents are dried until the slurry is set. The mold contents are then removed, and fired at a temperature in the range of 1,000° F. to 1,700° F. for a period of time sufficient to insure rigid and permanent adherence of the dried slurry to the original half casting. It is understood that other metals such as copper, brass, or bronze and other types of silicates may be employed in the slurry. Materials other than metal powder may also be employed in the slurry because the only requisite is that the slurry be capable of hardening on the half casting and that the resultant finish be accurate, smooth and permanently adhering as a coating to the half casting and resist temperature up to 1,200° F. The resulting coated half castings are ready for the final pattern fitting operations, matching and mounting on suitable metal plates.

With respect to making of core boxes the procedure is slightly modified. Existing core boxes are used to produce half cores from the usual core making materials employed in the foundry. The same core boxes are used to provide half core shapes of a rigid, firm material such as castable refractory cement or resin, capable of being coated with a parting such as kerosene or graphite. A pattern is now prepared of a simple block shape which incorporates the desired external dimension of the final metal core box. This pattern may be made of wood, plaster, or any suitable pattern making material. This pattern will be used to make both halves of the core box. A suitable firm mold is made of each half core box. The molds may be made of any material suitable for the casting of metals. The cores produced in the first step outlined in this paragraph relating to the use of the existing core boxes are painted, coated or dipped with a refractory matetrial to increase their dimensions to compensate for metal shrinkage. These coated cores are placed in the molds which were designated as suitable, firm molds and a suitable metal for core boxes is poured into these molds. The resulting castings are now filled with a slurry. The half core shapes are now forced into the slurry and the same procedure followed with respect to permitting the slurry to set, removing the mold contents and firing at a temperature in the range of 1,000° F. to 1,700° F. The resulting coated half core boxes are now ready for the final fitting operations.

These and various other objects, features, and advantages will be more clearly understood from a reading of the detailed description of the invention in conjunction with the drawing in which:

FIGURE 1 is a block sequence diagram of the steps employed in this novel method to produce pattern equipment; and FIGURE 2 is a block sequence diagram of the steps employed in this novel method to produce core boxes.

This method for making pattern equipment includes the conventional steps of employing existing green sand molding pattern equipment to produce a drag mold half and a cope mold half. In these molds, no cores are set, preferably the mold halves are provided with a cover core or flat cope and a port for metal ingress. Each half mold is filled with liquid metal of any type suitable for casting. Alternatively, iron powder and sodium silicate may be rammed into the mold, dried, removed and sintered at a temperature of the order of 1750° F. in a controlled atmosphere such as a partial vacuum. The resultant castings are cleaned and heat treated in the conventional manner.

Because of the shrinkage and the rough surface of the castings produced by the above mentioned conventional steps, these half castings cannot be used as patterns. Advantageously, the steps outlined in block form in FIGURE 1 relate to the method of producing precision pattern equipment from these half castings. As indicated by block 10, a pair of mold halves are prepared from the original pattern equipment. In this instance they are made of refractory cement or of zircon sand and silicate or epoxy resin. These mold halves are then filled with slurry, as indicated by block 11. The half castings which have shrinkage and rough surfaces are inserted into this slurry, as indicated by block 12. The excess slurry is then removed, as indicated by block 13, which removal may be achieved in any convenient manner. The mold contents are then dried and set, as indicated by block 14. After the mold contents are dried and set, the mold contents are removed and fired (block 15) at a temperature of the order of 1,000° F. to 1,700° F. in a controlled atmosphere for a period of time sufficient to insure permanent adherence of the dried slurry to the original half castings. For example this period may be of the order of four to four and one half hours. The coated half castings are then fitted to the final pattern and are matched and mounted on suitable metal plates as indicated by block 16.

In the instance of core boxes the procedure previously described is slightly modified.

Existing core boxes are employed to produce half cores from the usual core making materials of any convenient type employed in the foundry. The same core boxes are used to provide half core shapes of rigid firm material such as castable refractory cements or epoxy resin capable of being coated with a parting. A pattern is also prepared of a simple block shape, which incorporates the desired external dimension of the final metal core box. Alternatively, a frame may be prepared for the use of iron powder as a sinter having internal dimensions of the size desired for the core box. This pattern is to be used to make both halves of the core box. All of these steps regarding the preparation of core boxes are conventional.

In accordance with the features of this invention, a suitable firm mold is made of each half core box, block 20. The molds are made of any material suitable for casting of metals. The cores are now molded. The cores produced by the steps outlined above are painted, coated or dipped with a refractory material to increase their dimensions to compensate for metal shrinkage, block 22. The cores are placed in the molds and a metal suitable for core boxes is poured into these molds, block 23. The resulting castings are filled with a slurry, as indicated by block 24. The half core shapes are inserted in the slurry, as indicated by block 25. The excess slurry is removed as indicated by block 26. The mold contents are permitted to dry and set, as indicated by block 27. These mold contents are then removed and fired at a temperature of the order of 1,000° F. to 1,700° F. for a period sufficient to insure permanent adherence of the slurry to the half core shapes, block 28. The final step is shown as block 29 and relates to the final fitting of the coated castings to the original patterns.

Alternatively, after the cores or sticks are formed by the step designated in 21, a frame may be formed. This frame is provided for a sintered metal powder core box having internal dimensions to the desired size. The cores or sticks from step 21 are logged (covered with a coating of desired thickness) to allow space for slurry as indicated by the step designated 22. The logged cores are now placed in the frame and the frame is filled with a mixture of metal powder, such as iron and sodium silicate which mixture is rammed into the frame and fired at a temperature of the order of 1,750° F. under a non-oxidizing atmosphere such as a vacuum of the order of 26″ to 28″ of mercury. The half castings or core boxes thus formed are filled with slurry, as indicated by block 24. The half cores are inserted in the slurry and the excess slurry removed, as indicated by blocks 25 and 26. The mold contents are dried until set and removed and fired, as indicated by block 28. The resulting cores are finally fitted into the precision patterns, as indicated by block 29.

It is understood by those skilled in the art that various other modifications may be employed and that various other materials may be substituted, in the previously described embodiments without departing from the spirit and scope of the invention.

What is claimed is:

1. In a method for making shell molding pattern equipment which is compensated for shrinkage including the steps of producing half castings from drag and cope molds with an original pattern, the combination of steps comprising:

pouring a slurry of metal powder and a metal silicate into said drag and cope molds, inserting said half castings into said drag and cope molds, respectively, and removing excess slurry, drying the mold and contents until the slurry forms a coating on said castings, removing and firing the coated castings at a temperature in the range of 1,000° F. to 1,700 °F. in a controlled atmosphere for a period sufficient to insure rigid and permanent adherence of the dried slurry to the half castings; and mounting the coated half castings on metal plates.

2. The method according to claim 1 wherein the metal powder is selected from the group consisting of iron, copper, brass and bronze.

3. The method according to claim 1 wherein the metal silicate is sodium silicate and wherein said period is in the range of four to four and one half hours.

4. In a method for making precision shell molding pattern equipment compensated for shrinkage including the steps of producing half castings from a set of drag and cope molds with an original pattern, the combination of steps including:

pouring a slurry of metal powder and a metal silicate into said drag and cope molds;

inserting said half castings into respective ones of said molds, removing the excess slurry from said molds, and permitting said slurry to form a coating on said castings; and removing the coated castings from said molds and firing said coated castings at a temperature in the range of 1,000° F. to 1,700° F. to insure rigid and permanent adherence of the coating to said half castings.

5. In a method for making precision shell molding pattern equipment including the steps of:

producing half cores in a pair of core boxes;

producing a second pair of half cores;

preparing a pattern of block shape which incorporates the external dimension of a final metal core box;

making a firm mold of each half core box of material suitable for the casting of metals;

coating said cores to compensate for metal shrinkage;

placing said coated cores in said molds to produce castings;

filling said castings with a slurry of metal powder and a metal silicate;

inserting said second pair of half cores into said slurry;

permitting said slurry to dry until set; and removing the contents, firing said coated half cores at a temperature in the range of 1,000° F. and inserting said half core boxes in suitable molding patterns.

6. The method according to claim 5 wherein said slurry contains metal powder selected from the group consisting of iron, copper, brass, and bronze.

7. The method according to claim 5 wherein said metal silicate is sodium silicate and wherein said firing extends for a period of four to four and one half hours.

References Cited

UNITED STATES PATENTS

| | | | |
|---|---|---|---|
| 2,047,124 | 7/1936 | Cutts et al. | 164—45 |
| 2,420,851 | 5/1947 | Zahn et al. | 164—35 |
| 2,914,823 | 12/1959 | Bean | 164—10 X |
| 3,063,113 | 11/1962 | Operhall et al. | 164—45 |
| 3,085,895 | 4/1963 | Gutman | 164—45 X |
| 3,192,579 | 7/1965 | Lubalin | 164—25 X |

J. SPENCER OVERHOLSER, *Primary Examiner.*

EUGENE MAR, *Assistant Examiner.*

U.S. Cl. X.R.

164—11, 25, 33, 235